(12) United States Patent
Parent et al.

(10) Patent No.: US 7,541,756 B1
(45) Date of Patent: Jun. 2, 2009

(54) TEMPERATURE COMPENSATED TEST FOR A POWER DISTRIBUTION SWITCHING DEVICE

(75) Inventors: Jeanne Marie Parent, Franklin, WI (US); Yi Li, Franklin, WI (US); Patrick Damian Holinka, Milwaukee, WI (US)

(73) Assignee: Cooper Technologies Company, Houston, TX (US)

( * ) Notice: Subject to any disclaimer, the term of this patent is extended or adjusted under 35 U.S.C. 154(b) by 147 days.

(21) Appl. No.: 11/283,049

(22) Filed: Nov. 21, 2005

Related U.S. Application Data

(60) Provisional application No. 60/646,533, filed on Jan. 25, 2005.

(51) Int. Cl.
  *H02P 1/00* (2006.01)
  *H02P 3/00* (2006.01)
  *H02P 5/00* (2006.01)

(52) U.S. Cl. .................. 318/139; 318/153; 318/432; 318/434; 318/471

(58) Field of Classification Search .............. 318/139, 318/153, 432, 434, 471
See application file for complete search history.

(56) References Cited

U.S. PATENT DOCUMENTS

| | | | | |
|---|---|---|---|---|
| 5,151,644 | A * | 9/1992 | Pearson et al. | 320/163 |
| 5,168,206 | A * | 12/1992 | Jones | 320/163 |
| 5,514,945 | A * | 5/1996 | Jones | 320/128 |
| 5,708,348 | A * | 1/1998 | Frey et al. | 320/145 |
| 6,118,237 | A * | 9/2000 | Kikuchi et al. | 318/139 |
| 6,422,331 | B1 * | 7/2002 | Ochiai et al. | 180/65.2 |
| 2003/0169001 | A1 * | 9/2003 | Murakami et al. | 318/139 |
| 2005/0077867 | A1 * | 4/2005 | Cawthorne et al. | 320/104 |
| 2006/0106553 | A1 * | 5/2006 | Melichar | 702/63 |

OTHER PUBLICATIONS

Reclosers, Cooper Power Systems, "Kyle Form 4C Microprocessor-Based Recloser Control Installation and Operation Instructions," Service Information S280-77-1, Jun. 2004 (Supersedes Jun. 2002), pp. 1-52.

(Continued)

*Primary Examiner*—Lincoln Donovan
*Assistant Examiner*—Erick Glass
(74) *Attorney, Agent, or Firm*—Fish & Richardson P.C.

(57) ABSTRACT

An actuator, such as a motor of a power distribution switching device, may be operated by measuring at least one temperature parameter associated with an energy storage device (e.g., a battery) of the actuator, and establishing a recovery period and a reference voltage based on a measured temperature parameter. The reference voltage represents a sufficient terminal voltage of the energy storage device in the operational condition. During testing, a load is applied to the energy storage device for a predetermined time period, and the terminal voltage for the energy storage device is measured during the predetermined time period and compared with the reference voltage as a measure of the capability of the energy storage device to deliver an operational load. Following testing, actuator operation is inhibited for the established recovery period to allow the energy storage device to recover the capability to deliver the operational load. Actuator operation is allowed after the expiration of the actuator recovery period if the measured terminal voltage exceeds the reference voltage at that time.

32 Claims, 5 Drawing Sheets

OTHER PUBLICATIONS

Reclosers, Cooper Power Systems, "Kyle® Form 5 Microprocessor-Based Recloser Control Installation and Operation Instructions," Service Information S280-79-1, Dec. 2002 (Supersedes Apr. 2001), pp. 1-40.

Reclosers, Cooper Power Systems, "Form 6 Triple-Single Microprocessor-Based Pole Mount Recloser Control Installation and Operation Instructions," Service Information S280-70-7, Nov. 2004 (Supersedes Mar. 2004), pp. 1-44).

* cited by examiner

TEMPERATURE COMPENSATED TEST FOR A POWER DISTRIBUTION SWITCHING DEVICE

CROSS-REFERENCE TO RELATED APPLICATIONS

This application claims priority to U.S. Provisional Application No. 60/646,533, which was filed on Jan. 25, 2005, and is incorporated by reference.

TECHNICAL FIELD

This document relates to testing batteries and other energy storage devices, and more particularly to measuring the capability of a rechargeable battery or other energy storage device to operate a power distribution switching device.

BACKGROUND

Battery tests for high-power, rechargeable batteries are inherently complicated. In many situations, especially where the batteries are used to power heavy-duty motors, it is often not sufficient to determine whether a battery is fully charged, because the battery may exhibit correct voltage at the terminals or even deliver its rated load for a short time, and yet fail to power the motor over a longer period. The problem of correctly evaluating battery capability is particularly relevant for batteries powering motor-operated power distribution switches. Power distribution switches are often located in remote areas and are difficult to service. Therefore, it is important to prevent battery failures before they cause full-blown power switch failures. However, because motor batteries powering the switches remain idle for long periods of time and have to operate during extreme temperatures, the traditional load tests for these batteries may produce inaccurate results. As a result, the motor battery may pass the traditional load test, yet fail to supply enough energy to open or close a power distribution switch during actual operation.

SUMMARY

Operation of an actuator may include measuring at least one temperature parameter associated with an energy storage device of the actuator, and establishing a recovery period and a reference voltage based on the measured temperature parameter. For example, the actuator may be a motor of a power distribution switching device, and the energy storage device may be a battery that powers the motor. The reference voltage represents a sufficient terminal voltage of the energy storage device in the operational condition. During testing, a load is applied to the energy storage device for a predetermined time period, and the terminal voltage for the energy storage device is measured during the predetermined time period and compared with the reference voltage as a measure of the capability of the energy storage device to deliver an operational load. Following testing, actuator operation is inhibited for the established recovery period to allow the energy storage device to recover the capability to deliver the operational load. Actuator operation is allowed after the expiration of the actuator recovery period if the measured terminal voltage exceeds the reference voltage at that time.

In one general aspect, temperature-compensated operation of an actuator includes measuring at least one temperature parameter associated with an energy storage device of the actuator, computing at least one temperature-dependent variable based on at least one of the measured temperature parameters, and restricting one or more actuator operations based on at least one of the temperature-dependent variables.

Implementations may include one or more of the following features. For example, the actuator may comprise a motor, and the energy storage device may comprise, for example, a battery or a capacitor.

The temperature-dependent variable comprises an energy storage device recovery period, and restricting one or more actuator operations may include inhibiting actuator operation for the computed recovery period to allow the energy storage device to recover the capability to deliver its operational load. A user may be notified that actuator operation has been inhibited.

A reference voltage that represents a sufficient terminal voltage of the energy storage device to operate the actuator may be computed based on at least one of the measured temperature parameters. A load test may be performed on the energy storage device by applying a load to the energy storage device for a predetermined time period, measuring a terminal voltage for the energy storage device during the predetermined time period, and comparing the terminal voltage with the reference voltage as a measure of the capability of the energy storage device to operate the actuator. The load may include the actuator and/or a predetermined resistive load. Actuator operation may be allowed after the expiration of the recovery period if the measured terminal voltage exceeds the reference voltage, or inhibited after the expiration of recovery period if the measured terminal voltage does not exceed the reference voltage.

The temperature-dependent variable also may include the number of actuator operations without an external power source, or an allowable time for actuator operations without the external power source. Actuator operation may be inhibited after exceeding the allowable number of actuator operations or the allowable actuator operation time without the external power source. The external power source may be an AC power source or a DC power source.

The temperature parameter may include an ambient temperature within a housing of the actuator or a surface temperature of the energy storage device.

In another general aspect, operating an actuator includes applying a load to an energy storage device of the actuator for a predetermined time period, measuring a terminal voltage for the energy storage device during the predetermined time period, and comparing the terminal voltage with a reference voltage that represents a sufficient terminal voltage of the energy storage device to operate the actuator. When the comparison indicates that the energy storage device is unable to operate the actuator, actuator operation is inhibited for an energy storage device recovery period associated with the energy storage device to allow the energy storage device to recover the capability to deliver its operational load.

Implementations may include one or more of the features discussed above. For example, as noted above, the load may be the actuator or a motor of the actuator, and the energy storage device comprises a battery.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A switch allows a switch operator to perform two distinct battery tests. First, a quick control battery test allows the operator to test the capability of a battery through a traditional load test of a predetermined resistive load. However, in some cases, the battery may pass the load test and still fail to operate the motor. Therefore, an additional motor battery test is provided to assure that the battery has sufficient energy to power the motor.

Figure 1:
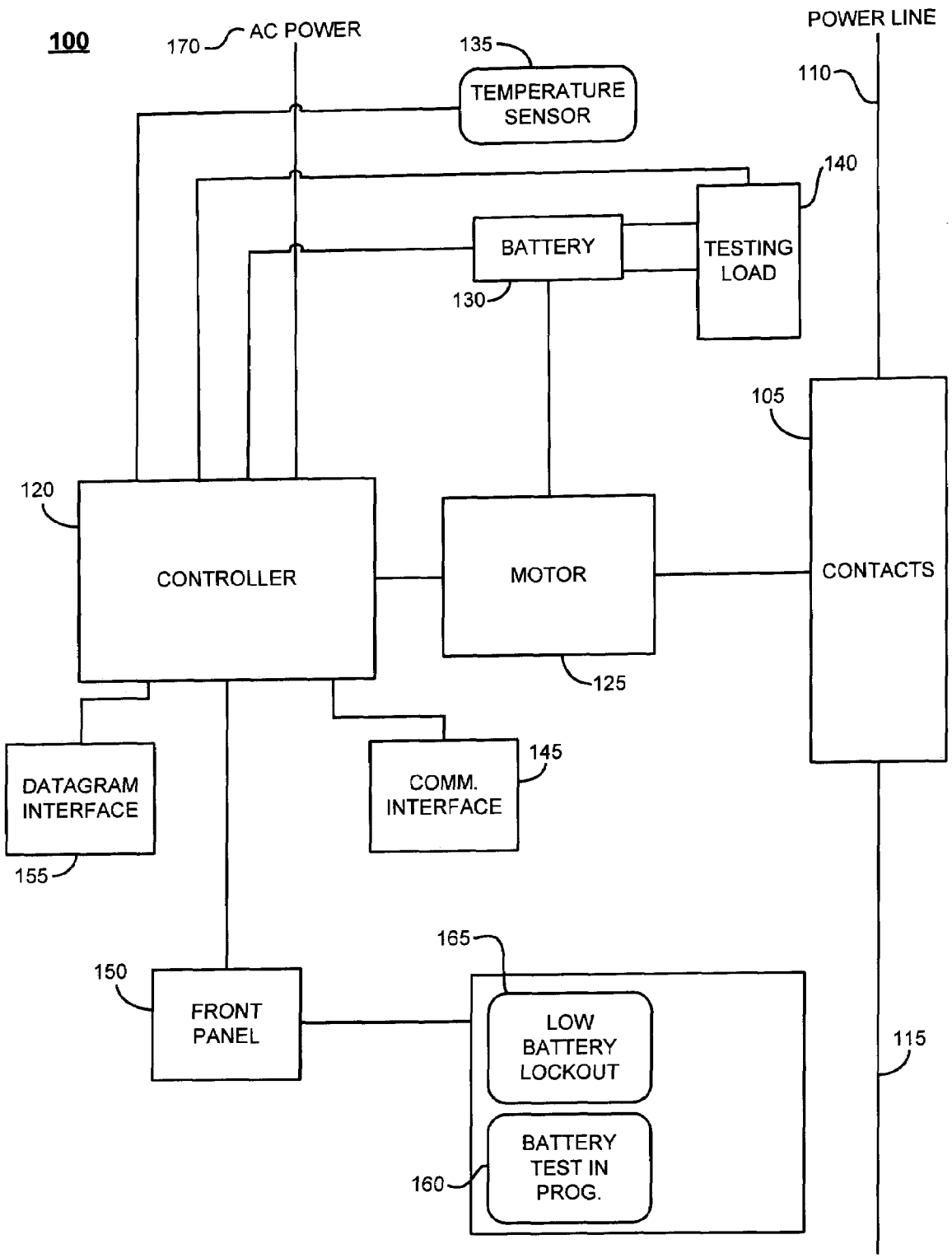
FIG. 1 is a block diagram of a switch.

FIG. 1 shows a switch system 100 for controlling and monitoring the operation of contacts 105 that may be used to selectively make or break a connection between power lines 110 and 115. For example, the switch system 100 may control the contacts 105 to break the connection so as to provide fault protection between the power lines 110 and 115 and/or to isolate problem areas based on trouble that may be sensed by a remotely-located protective relay or by the switch system 100. The switch system 100 may include assemblies of switching or interrupting devices, along with control, metering, protective, and regulating devices. For example, the system 100 may act as a recloser, a switch, or a breaker. In one implementation, the switch system may provide switching and/or tying operations between connections of the electrical power lines 110 and 115.

The switch system 100 includes a switch controller 120 connected to a motor 125, a battery 130, a temperature sensor 135, and a testing load 140. The controller 120 includes an interface and other electronic circuitry through which a user can monitor and control the operation of the switch. For example, the controller 120 may be operated through a communication interface 145, a front panel 150, or a datagram interface 155. In one implementation, the front panel 150 may include various LEDs or other indicators to visually communicate with a user, such as a "Battery Test in Prog" LED 160 and a "Low Battery Voltage" LED 165. Under control of the controller 120, the motor 125 operates the contacts 105 to provide switching operations between power lines 110 and 115. In one implementation, the switch may connect or disconnect power lines 110 and 115 by making or breaking a power circuit connection between the contacts 105 and the power lines.

The controller 120 and the motor 125 share a common connection to the battery 130. The controller 120 is also connected to an AC power source 170 that provides power to the controller 120 as well as power for charging the battery 130. In addition, the controller 120 is able to gather various performance and operational statistics from the battery 130 and the temperature sensor 135. For example, the controller 120 may measure the terminal voltage of the battery 130 by applying the testing load 140 to the battery 130, and the temperature sensor 135 may measure the temperature of the CPU of the controller. Based on the collected statistics or in response to a user request, the controller 120 may run or schedule various battery tests. For example, the controller 120 may schedule motor battery tests every 24 hours at user-defined times, may perform the battery test in response to user input from one of the interfaces 145-155 of the controller, or may perform the test during AC-power loss scenarios.

Figure 2:
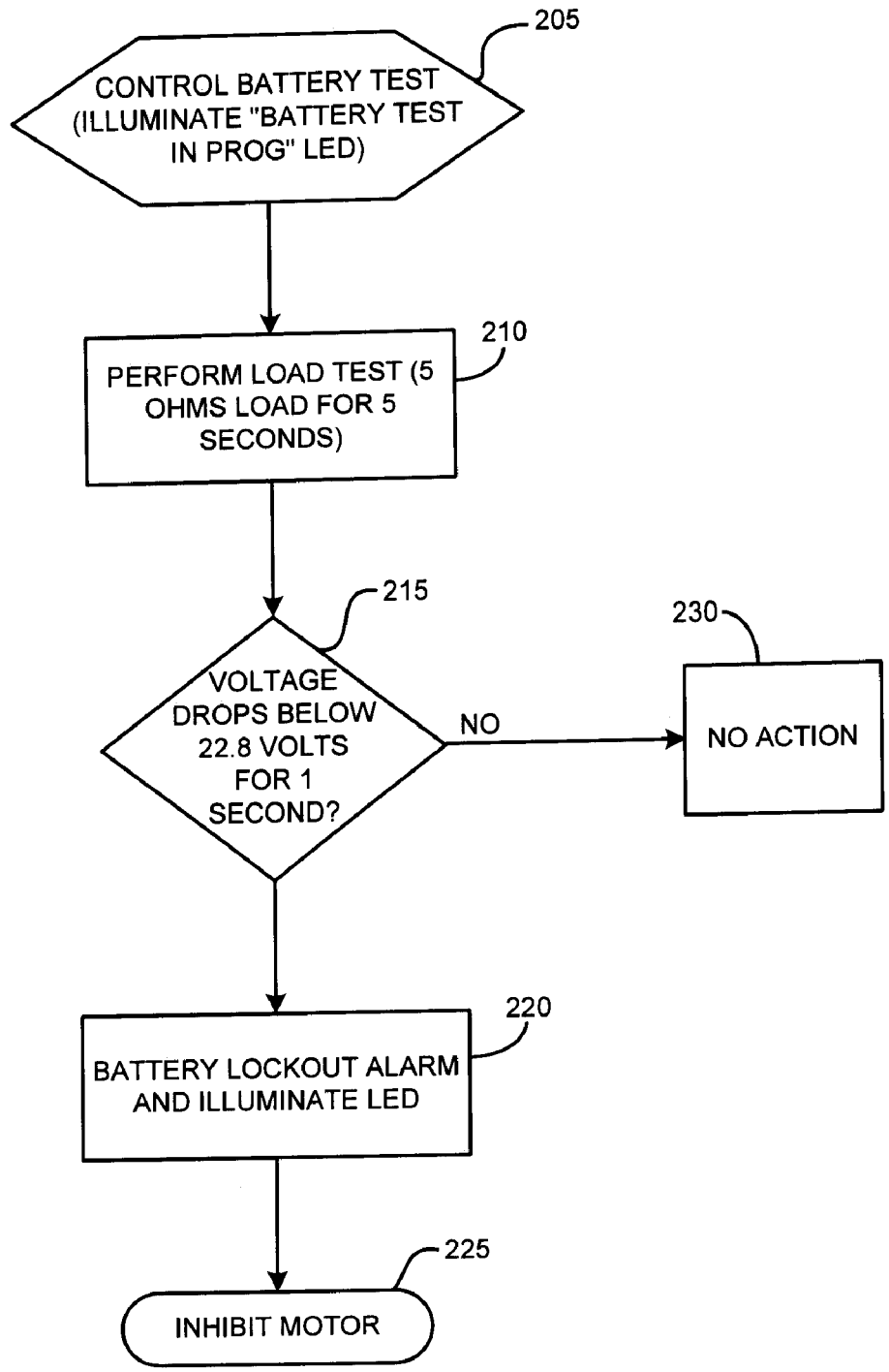
FIG. 2 is a flowchart illustrating a battery test.

FIG. 2 shows a method 200 of load testing motor batteries that may be employed by the controller 120. The controller 120 connects the testing load 140 to the battery 130 for a predetermined time period and then measures the terminal voltage of the battery. If the terminal voltage remains above a certain predetermined threshold for a given period, the battery 130 is considered operational. In the beginning of the test, the controller illuminates the "Battery Test in Prog" LED 160 (205). Next, the controller connects the 5-ohm resistive load 140 to the battery 130 for 5 seconds (210). During the 5 seconds, the controller measures the terminal voltage of the battery 130 (215). If the measured voltage drops below 22.8 volts for at least one second, the battery 130 is considered drained. In such a situation, the controller 120 illuminates the "Low Battery Voltage" LED 165 (220) and generates an additional sequence of safety operations, such as inhibiting the motor 125 (225). In certain implementations, the LED 165 may only be deactivated, and the safety operations may only be reversed, when the battery passes a subsequent test. If the terminal voltage does not drop below 22.8 volts for at least 1 second, then the battery 130 is considered operational and the controller takes no responsive action (230).

Figure 3:
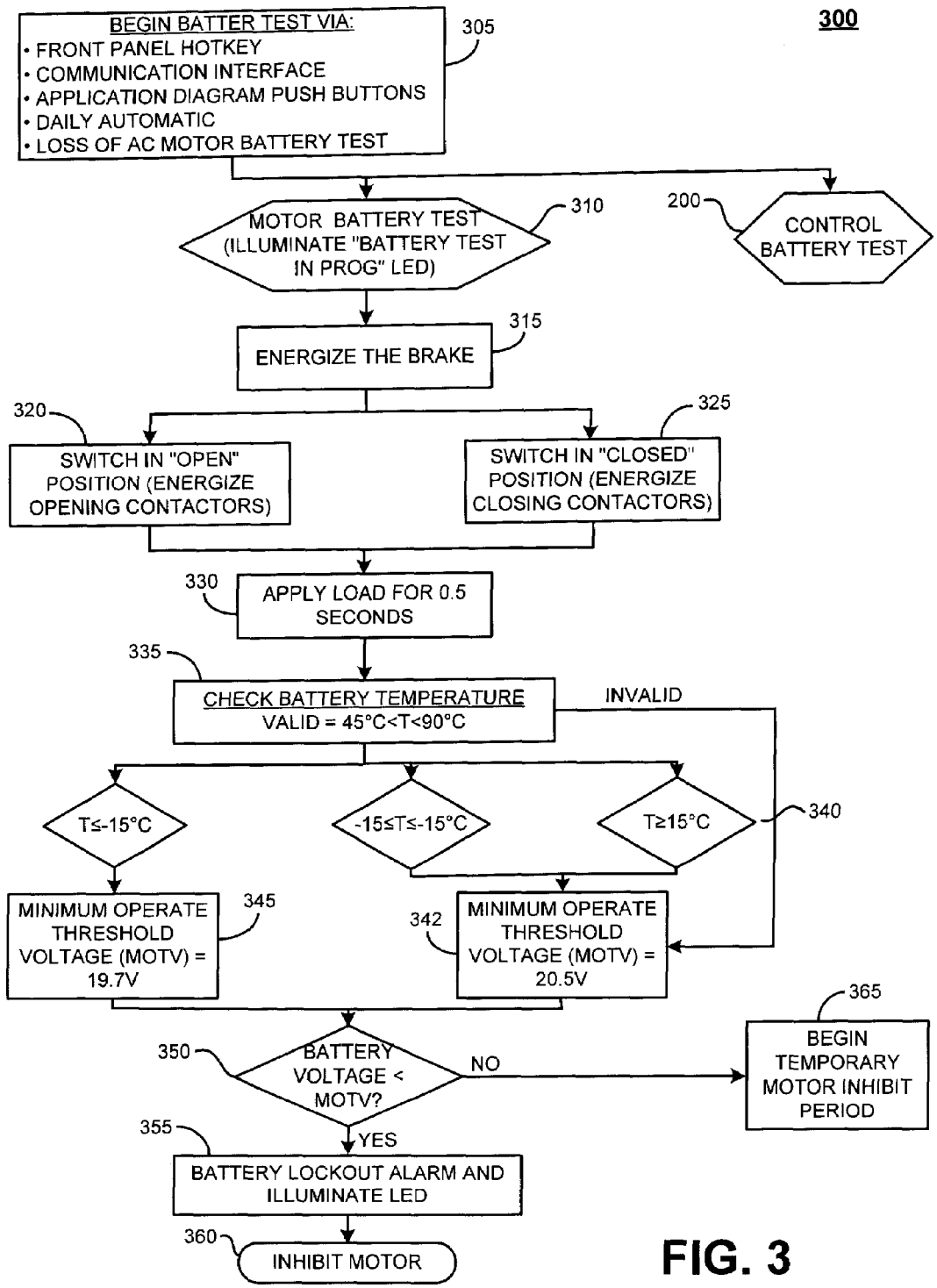
FIG. 3 is a flowchart illustrating a temperature-compensated motor battery test.

FIG. 3 illustrates a motor battery test 300 that accurately determines whether the battery 130 is capable of powering the motor 125 under varying temperature conditions. The motor battery test may be administered separately or in conjunction with the control battery test 200. For example, the test 300 may be initiated as a further check after the test 200 determines that the battery 115 is operational.

The motor battery test may be triggered (305) by, for example, manipulation of a front panel key, receipt of a test request through a communication interface, actuation of application datagram push buttons, as a daily automatic test, or by the controller as part of a loss of AC motor battery test such as is described below. Initially, the controller 120 illuminates the "Battery Test in Prog" LED 160 (310). Next, the controller 120 energizes electromechanical brakes of the motor 125 to operate without any external load (315). If the switch is in the "Open" position, the controller 120 energizes only the opening contactors (320). On the other hand, if the switch is in the "Closed" position, the controller 120 energizes only the closing contactors (325). After enabling the motor 125 and releasing the brakes, the controller 120 operates the motor 125 (330), simulating an actual open or close operation. In one implementation, the motor is operated for 0.5 seconds. Since the clutch is not engaged, the position of the switch does not change. While operating the motor 125, the controller 120 measures and determines the minimum terminal voltage of the battery 130 and compares it to a Minimum Operate Threshold Voltage (MOTV). MOTV is temperature dependent. In general, as battery temperature rises, electrochemical activity in a battery increases. Conversely, electrochemical activity in a battery decreases as temperature falls. Therefore, the battery will tend to generate higher terminal voltages at higher temperatures, and the MOTV increases with temperature. The computation of MOTV is described below.

First, the controller 120 measures the (control) temperature of the CPU of the controller (335). Due to the internal self-heating, there is a temperature difference between the ambient temperature (e.g., the ambient temperature within a housing that contains the controller) and the temperature measured by the temperature sensor 135. As a result, the control temperature is usually higher than the ambient temperature. The two temperatures may be related according to the equations below:

$T_{difference} = -0.127(T_{control}) + 12.58$ $T_{ambient} = T_{control} - T_{difference}$ The controller 120 next checks the measured control temperature for validity. The valid measurements must remain between −45 C and +90 C. The controller 120 considers measurements falling outside of this range to be invalid and, when faced with such measurements, assigns a default value to MOTV (342). If, on the other hand, $T_{control}$ is valid (340), the controller 120 computes the value of MOTV based on Table 1 (345).

TABLE 1

| Tcontrol | −15 <= T | −15 <= T <= 15C. | >=15C. | Invalid Value |
|---|---|---|---|---|
| MOTV | 19.7 V | 20.5 V | 20.5 V | 20.5 V |

In the final stages of the test, the controller 120 compares the measured battery voltage to MOTV (350). If the measured voltage is less than MOTV, the controller 120 decides that the battery 130 does not have sufficient stored energy to safely open or close the power switch. In such a situation, the controller 120 illuminates the "Low Battery Voltage" LED 165 (355) and generates an additional sequence of safety operations, such as inhibiting the motor 125 (360). On the other hand, if the measured voltage exceeds or is equal to MOTV, then the controller 120 proceeds to the battery recovery mode illustrated in FIG. 4 (365).

Figure 4:
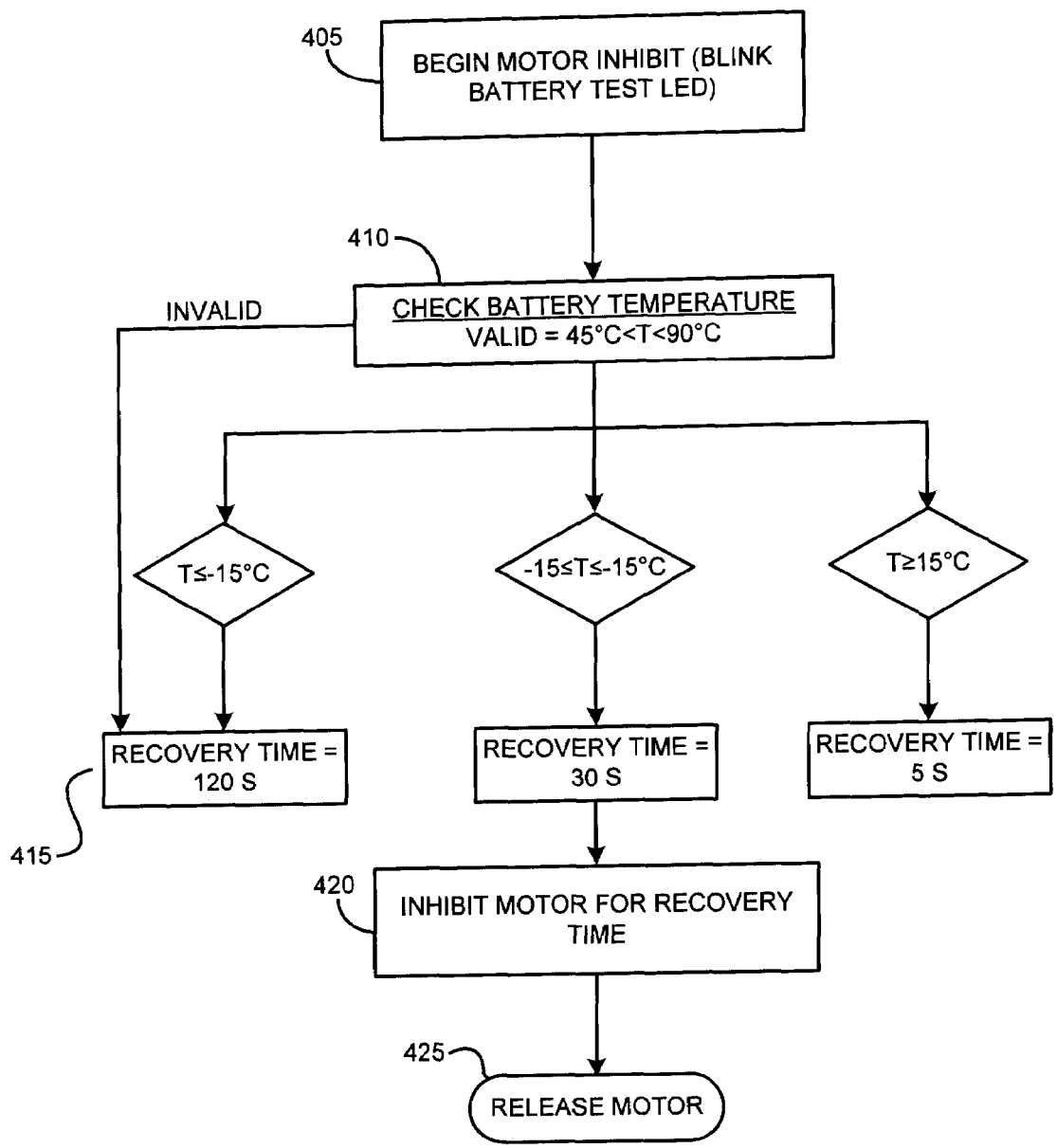
FIG. 4 is a flowchart of a battery recovery procedure following the motor battery test.

FIG. 4 shows a block diagram of a battery recovery process 400 that may be implemented after the motor battery test or after open/close operations. To begin the process, the controller 120 illuminates the "Battery Recovery Mode LED (405). Due to a large current drain caused by operation of the motor 125, the battery 130 requires time to recover before the next operation in order to replenish its stored energy and insure reliable operation of the switch. The recovery time varies according to the control temperature as shown in Table 2. Since Electrochemical activity in a battery normally decreases as temperature falls, the battery 130 generally requires more time to recover at lower temperatures. The controller 120 may measure the value of $T_{control}$ after the motor battery test or after the open/close motor operation (410). Alternatively, the controller 120 may reuse the value computed in the first stage of the motor battery test.

TABLE 2

| Tcontrol | −15 <= T | −15 <= T <= 15C. | >=15C. | Invalid Value |
|---|---|---|---|---|
| Recovery Time | 15 seconds | 5 seconds | 15 seconds | 15 seconds |

Once the recovery time is determined, the controller 120 inhibits all motor operations for a computed recovery time in order to ensure that the battery 130 is not used and has a sufficient time to recover the lost energy (420). After expiration of the recovery period, the controller 120 releases the motor inhibit 125 and turns off the "Battery Recovery Mode" LED 160 (425). At that point, the battery 130 should recover sufficient energy to perform the subsequent switch operations.

Figure 5:
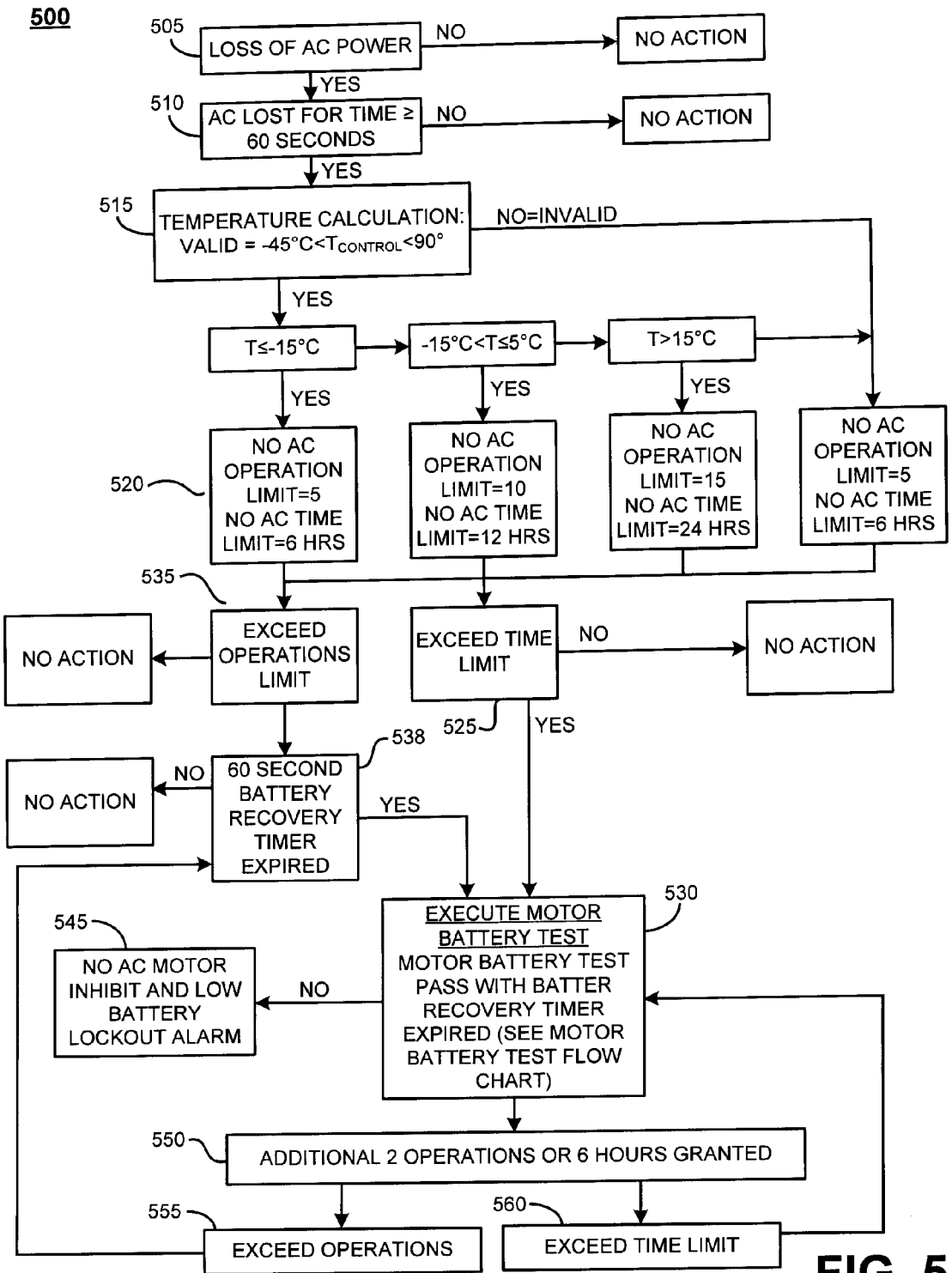
FIG. 5 is a flowchart of a recovery procedure following the loss of AC power to a device including a battery.

FIG. 5 illustrates a recovery procedure 500 that may be implemented following the loss of AC power to the switch. When AC power is not present, the battery is unable to be recharged. However, since the switch and control are powered by the battery, both remain operational until the battery's health has been determined to be poor. Whenever AC power is lost, the controller 120 may impose a limit on the number of times the motor 125 can be operated to ensure reliable operation of the switch (505). In addition, to ensure reliable operation, the controller 120 may disallow the switch operation without AC power after expiration of a certain time limit. Both the operation count limit and the time limit are temperature-dependent. If AC power is lost for more than 60 seconds (510), the controller 120 measures the control temperature of the battery 130 ($T_{control}$) (515). Next, the controller 120 computes operation and time limits based on Table 3 (520).

TABLE 3

| Tcontrol | t T < −15C. | −15 <= T < 15C. | T >= 15C. | Invalid Value |
|---|---|---|---|---|
| Number of Operations | 6 | 12 | 20 | 6 |
| Operation Time (hours) | 6 | 12 | 24 | 6 |

If the time limit is exceeded (525) the controller 120 performs the motor battery test, as has been previously discussed with respect to FIG. 3 (530). Additionally or alternatively, the controller 120 also may perform the motor battery test once the limit on the allowed number of operations has been exceeded (535). In this case, the controller 120 inhibits motor operation for a period (e.g., 60 seconds) sufficient to allow for battery recovery (540) before performing the battery test (530).

If the battery 130 fails the test, the controller 120 inhibits further motor operations, illuminates the "Low Battery Voltage" LED 165 and generates an additional sequence of safety operations, such as inhibiting the motor 125 (545).

If the battery 130 passes the test, the controller 120 determines that the battery 130 has enough stored energy to operate for another six hours or, alternatively, for three full open or close operations (550). The controller 120 then repeats the above battery testing process every three operations or every six hours until the battery 130 fails the motor battery test when the number of operations is exceeded (555) or when the time limit is exceeded (560). Once the battery 130 fails the test, the controller proceeds as noted above (545).

If AC power is returned after the controller 120 inhibits the motor 125 due to failed battery test, another motor battery test is performed at a later time to ensure that the battery 130 has a sufficient amount of stored energy to properly operate the switch.

A number of implementations have been described. Nevertheless, it will be understood that various modifications may be made. For example, the methods described above are applicable to other systems using batteries to power electric motors in outdoor conditions. Such systems may include alarm systems, communication equipment, emergency lightning systems, electric powered bicycles and wheelchairs, fire and security systems, geophysical equipment, marine equipment, solar powered systems, and telecommunication systems. Accordingly, other implementations are within the scope of the following claims.

What is claimed is:

1. A method of temperature-compensated operation of an actuator that operates contacts of a power distribution switch provided between power lines, the method comprising:

operating the actuator in a test mode in which an external load is applied and the position of the power distribution switch contacts remains unchanged;

while the actuator operates in the test mode:

measuring at least one temperature parameter associated with an energy storage device of the actuator; and computing at least one temperature-dependent variable based on at least one of the measured temperature parameters; and restricting one or more actuator operations based on at least one of the temperature-dependent variables.

2. The method according to claim 1, wherein the actuator comprises a motor.

3. The method according to claim 1, wherein the energy storage device comprises a battery.

4. The method according to claim 1, wherein the temperature parameter comprises an ambient temperature.

5. The method according to claim 1, wherein the temperature parameter comprises a surface temperature of the energy storage device.

6. The method according to claim 1, wherein the temperature parameter indicates a temperature at which the energy storage device operates.

7. A method of temperature-compensated operation of an actuator that operates contacts of a power distribution switch provided between power lines, the method comprising:

operating the actuator in a test mode in which an external load is applied and the position of the power distribution switch contacts remains unchanged;

while the actuator operates in the test mode:
measuring at least one temperature parameter associated with an energy storage device of the actuator; and computing at least an energy storage device recovery period based on at least one of the measured temperature parameters; and restricting one or more actuator operations based on the energy storage device recovery period.

8. The method according to claim 7, wherein restricting one or more actuator operations comprises inhibiting actuator operation for the computed recovery period to allow the energy storage device to recover the capability to deliver its operational load.

9. The method according to claim 8, further comprising notifying a user that actuator operation has been inhibited.

10. The method according to claim 8, wherein computing at least one temperature-dependent variable further comprises computing a reference voltage based on at least one of the measured temperature parameters, wherein the reference voltage represents a sufficient terminal voltage of the energy storage device to operate the actuator.

11. The method according to claim 10, further comprising:
applying a load to the energy storage device for a predetermined time period;
measuring a terminal voltage for the energy storage device during the predetermined time period; and
comparing the terminal voltage with the reference voltage as a measure of the capability of the energy storage device to operate the actuator.

12. The method according to claim 11, wherein the load comprises the actuator.

13. The method according to claim 11, wherein the load comprises a predetermined resistive load.

14. The method according to claim 11, wherein inhibiting actuator operation further comprises allowing actuator operation after the expiration of the recovery period if the measured terminal voltage exceeds the reference voltage.

15. The method according to claim 11, wherein inhibiting actuator operation further comprises inhibiting actuator operation after the expiration of recovery period if the measured terminal voltage does not exceed the reference voltage.

16. A method of temperature-compensated operation of an actuator, the method comprising:
measuring at least one temperature parameter associated with an energy storage device of the actuator;
computing at least an allowable number of actuator operations without an external power source based on at least one of the measured temperature parameters; and
restricting one or more actuator operations based on the computed allowable number of actuator operations without an external power source.

17. The method according to claim 16, wherein inhibiting actuator operation further comprises inhibiting actuator operation after exceeding the allowable number of actuator operations without the external power source.

18. The method according to claim 16 wherein the external power source comprises an AC power source.

19. The method according to claim 16 wherein the external power source comprises a DC power source.

20. A method of temperature-compensated operation of an actuator, the method comprising:
measuring at least one temperature parameter associated with an energy storage device of the actuator;
computing at least an allowable time for actuator operation without an external power source based on at least one of the measured temperature parameters; and
restricting one or more actuator operations based on the computed allowable time for actuator operation without an external power source.

21. The method according to claim 20, wherein inhibiting actuator operation further comprises inhibiting actuator operation after the expiration of the allowable time for actuator operation without an external power source.

22. An actuator controller configured to provide temperature-compensated operation of an actuator that operates contacts of a power distribution switch provided between power lines, the controller being configured to:
operate the actuator in a test mode in which an external load is applied and the position of the power distribution switch contacts remains unchanged;
while the actuator operates in the test mode:
measure at least one temperature parameter associated with an energy storage device of an actuator that operates a power distribution switch provided between power lines; and
compute at least one temperature-dependent variable based on at least one of the measured temperature parameters; and
restrict one or more actuator operations based on at least one of the temperature-dependent variables.

23. The actuator controller according to claim 22, wherein the actuator comprises a motor.

24. An actuator controller configured to provide temperature-compensated operation of an actuator, the controller being configured to:
measure at least one temperature parameter associated with an energy storage device of the actuator;
compute at least one temperature-dependent variable based on at least one of the measured temperature parameters; and
restrict one or more actuator operations based on at least one of the temperature-dependent variables,
wherein the temperature-dependent variable comprises an allowable number of actuator operations without an external power source.

25. The actuator controller according to claim 24, wherein restricting one or more actuator operations comprises inhibiting actuator operation after exceeding the allowable number of actuator operations without the external power source.

26. The actuator controller according to claim 24, wherein the external power source comprises an AC power source.

27. The actuator controller according to claim 24, wherein the external power source comprises a DC power source.

28. An actuator controller configured to provide temperature-compensated operation of an actuator, the controller being configured to:
   measure at least one temperature parameter associated with an energy storage device of the actuator;
   compute at least one temperature-dependent variable based on at least one of the measured temperature parameters; and
   restrict one or more actuator operations based on at least one of the temperature-dependent variables,
   wherein the temperature-dependent variable comprises an allowable time for actuator operation without an external power source.

29. The actuator controller according to claim 28, wherein inhibiting actuator operation further comprises inhibiting actuator operation after the expiration of the allowable time for actuator operation without an external power source.

30. The actuator controller according to claim 22, wherein the temperature parameter indicates a temperature at which the energy storage device operates.

31. The actuator controller according to claim 22, wherein the temperature parameter comprises an ambient temperature.

32. A method of temperature-compensated operation of an actuator that operates contacts of a power distribution switch provided between power lines, the method comprising:
   operating the actuator in a test mode in which an external load is applied and the position of the power distribution switch contacts remains unchanged;
   while the actuator operates in the test mode:
      measuring at least one temperature parameter associated with an energy storage device of the actuator; and
      computing at least a minimum operate threshold voltage based on at least one of the measured temperature parameters; and
   restricting one or more actuator operations by comparing the minimum operate threshold voltage to a measured terminal voltage of the energy storage device.

* * * * *